United States Patent
Smith et al.

(10) Patent No.: US 11,422,140 B1
(45) Date of Patent: Aug. 23, 2022

(54) AUTOSAMPLER SAMPLE PROBE ARM MOUNT

(71) Applicant: Elemental Scientific, Inc., Omaha, NE (US)

(72) Inventors: Scott Smith, Honey Creek, IA (US); Eric Radda, Omaha, NE (US); Daniel R. Wiederin, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 448 days.

(21) Appl. No.: 16/697,614

(22) Filed: Nov. 27, 2019

Related U.S. Application Data

(60) Provisional application No. 62/772,435, filed on Nov. 28, 2018.

(51) Int. Cl.
*G01N 35/00* (2006.01)
*G01N 1/10* (2006.01)

(52) U.S. Cl.
CPC ........... *G01N 35/0099* (2013.01); *G01N 1/10* (2013.01); *G01N 35/00584* (2013.01)

(58) Field of Classification Search
CPC ................. G01N 35/0099; G01N 1/10; G01N 35/00584; G01N 35/00; G01N 35/02; G01N 35/04
See application file for complete search history.

(56) References Cited

U.S. PATENT DOCUMENTS

| 5,332,549 | A | * | 7/1994 | MacIndoe, Jr. | ........ | G01N 35/04 422/562 |
| 5,356,525 | A | * | 10/1994 | Goodale | ............ | G01N 35/0099 204/604 |
| 5,472,669 | A | * | 12/1995 | Miki | .................. | G01N 35/0099 422/65 |
| 9,341,229 | B1 | * | 5/2016 | Wiederin | .................. | B01L 9/02 |

* cited by examiner

*Primary Examiner* — Herbert K Roberts
*Assistant Examiner* — Anthony W Megna Fuentes
(74) *Attorney, Agent, or Firm* — Kevin E. West; Advent, LLP

(57) ABSTRACT

An autosampler system can include a z-axis mount, a carriage, an autosampler arm, and a compression nut. The carriage can be axially positioned on the z-axis mount. The autosampler arm can define an arm extension and an autosampler arm mount. The autosampler arm mount can define an arm mount aperture, an arm mount inner ledge, and an arm mount compressible section, the arm mount aperture configured to receive the z-axis mount and the carriage therethrough. The arm mount inner ledge can extend from an interior of the arm mount aperture, with the arm mount inner ledge configured to receive the z-axis mount therethrough and be supported on the carriage. The arm mount compressible section can define a set of compressible section threading and at least one compressible section slot. The compression nut can be affixed to the arm mount compressible section via the set of compressible section threading.

20 Claims, 7 Drawing Sheets

AUTOSAMPLER SAMPLE PROBE ARM MOUNT

RELATED APPLICATIONS

The present application claims the benefit under 35 U.S.C. § 119(e) of U.S. Provisional Application Ser. No. 62/772,435, filed Nov. 28, 2018, and entitled "AUTOSAMPLER SAMPLE PROBE ARM MOUNT." U.S. Provisional Application Ser. No. 62/772,435 is herein incorporated by reference in its entirety.

BACKGROUND

In many laboratory settings, it is often necessary to analyze a large number of chemical or biological samples at one time. In order to streamline such processes, the manipulation of samples has been mechanized. Such mechanized sampling can be referred to as autosampling and can be performed using an automated sampling device, or autosampler.

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like), or other sample detector or analytic instrumentation for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure relate to an autosampler system that can include a z-axis mount, a carriage, an autosampler arm, and a compression nut. The carriage can be axially positioned on the z-axis mount. The autosampler arm can define an arm extension and an autosampler arm mount. The autosampler arm mount can define an arm mount aperture, an arm mount inner ledge, and an arm mount compressible section, the arm mount aperture configured to receive the z-axis mount and the carriage therethrough. The arm mount inner ledge can extend from an interior of the arm mount aperture, with the arm mount inner ledge configured to receive the z-axis mount therethrough and be supported on the carriage. The arm mount compressible section can define a set of compressible section threading and at least one compressible section slot. The compression nut can be affixed to the arm mount compressible section via the set of compressible section threading.

DRAWINGS

The Detailed Description is described with reference to the accompanying figures.

DETAILED DESCRIPTION

Overview

Figure 1A:
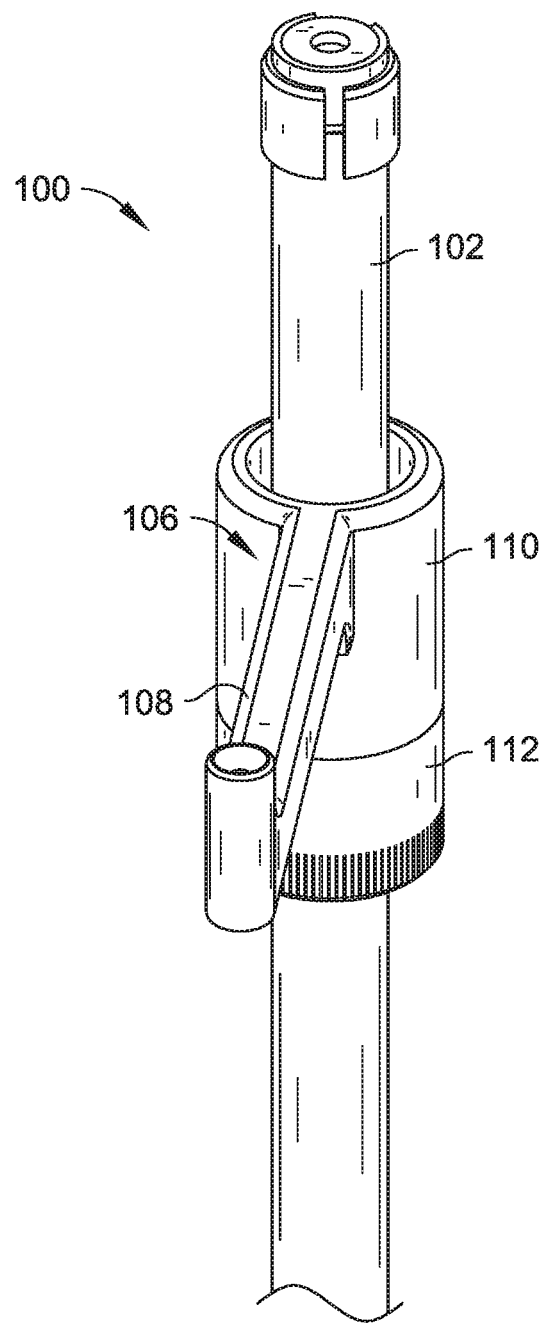
FIGS. 1A-1C are front, isometric views of an autosampler unit with the autosampler arm thereof in various stages of mounting relative to the carriage on a z-axis support, in accordance with an embodiment of the present invention.

Autosampler units can process samples automatically as a sample probe is moved from vial position to vial position to introduce the sample probe into the vials to draw samples. The sample probe can be coupled to an autosampler arm which is mounted to a z-axis support, which, in certain units, can translate along a slot in the autosampler table on which the samples are positioned, can rotate the sample probe along an x-y plane of rotation, and can raise/lower the sample probe along the z-axis. If the autosampler arm is moved with respect to the z-axis support, the calibration of the autosampler can be compromised. For instance, the autosampler unit can interpret the sample probe being in a different position than the actual position of the sample arm, which may cause mislabeling of samples analyzed following sampling and/or errors in sampling (e.g., the probe neglecting a sample vial, the probe missing an interior of the sample vial during a sampling procedure, and the like).

An example mounting of the autosampler arm to the z-axis support involves use of a set screw to friction fit against a carriage that can move on a rail of the z-axis support to provide vertical movement of the autosampler arm. If the screw is set too tightly, the carriage can resist motion on the rail of the z-axis support. If the screw is set too loosely, the autosampler arm can swing with respect to the carriage without also moving the z-axis support (the rotational position of which is encoded), so the autosampler unit may become uncalibrated. For example, an operator of the autosampler can accidentally nudge the autosampler arm, causing the autosampler arm to swing with respect to the carriage without also moving the z-axis support.

As such, the present autosampler arm can include an autosampler arm mount that can include threaded fittings to secure (e.g., via compression fit) the autosampler arm with respect to a carriage mounted or otherwise carried on the z-axis support. The autosampler arm mount can define an aperture through which the z-axis support and the carriage can pass. The aperture can further include a region with a narrower cross section (e.g., diameter, for example, in the form of an internally extending ledge) to cause an interior bottom surface of the narrower cross section to rest on a top surface of the carriage. The narrower cross section region can prevent further movement down the z-axis support by allowing the autosampler arm mount to rest on top of the carriage.

The autosampler arm mount can further include a threaded portion (e.g., on the bottom end of the mount when positioned on the z-axis support) that can couple with a corresponding threading on a mount secure portion (e.g., a compression nut). The threaded portion of the autosampler arm mount can include one or more slots that permit the threaded portion to compress inwards towards the carriage as the mount secure portion is tightened with respect to the threaded portion of the autosampler arm mount. Such compression upon tightening can help secure (e.g., both rotationally and longitudinally) the autosampler arm mount with respect to the carriage and the corresponding z-axis support.

Example Implementations

Figure 1B:
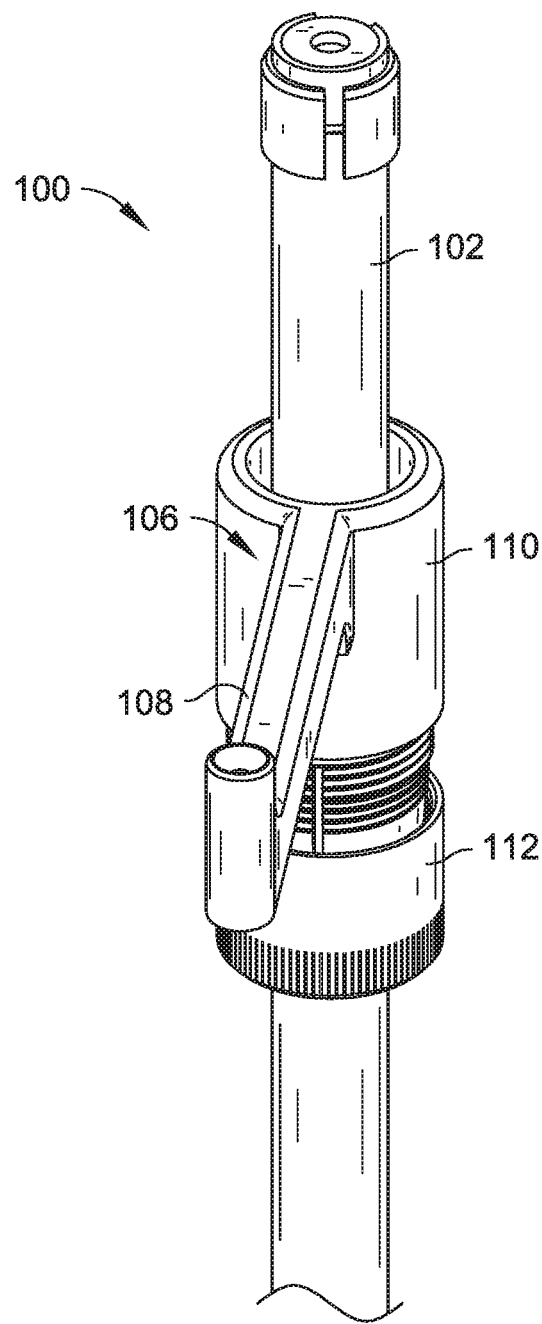
Figure 1C:
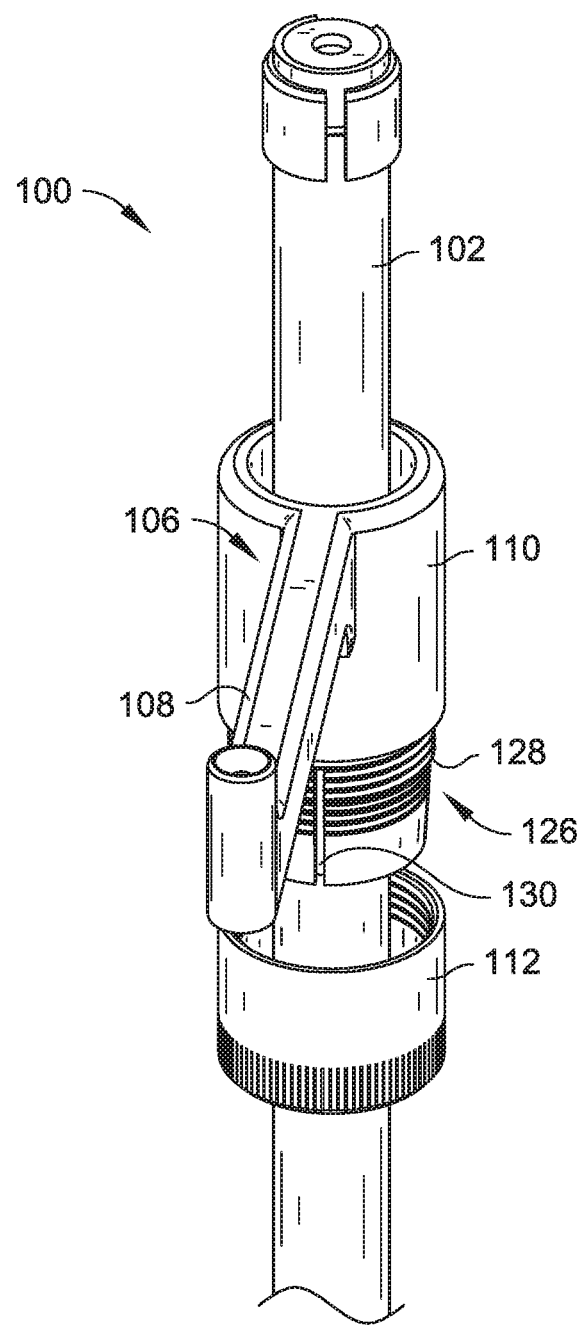

FIGS. 1A-1C show an autosampler system or unit 100, in accordance with an example embodiment of the present disclosure. The autosampler system 100 can generally include a z-axis mount 102, a carriage 104 (shown in FIGS. 2A-2B), and an autosampler arm 106. The autosampler arm 106 can further include an arm extension 108, an autosampler arm mount 110, and a mount securing portion 112 (best shown in FIGS. 4A-4C).

Figure 2A:
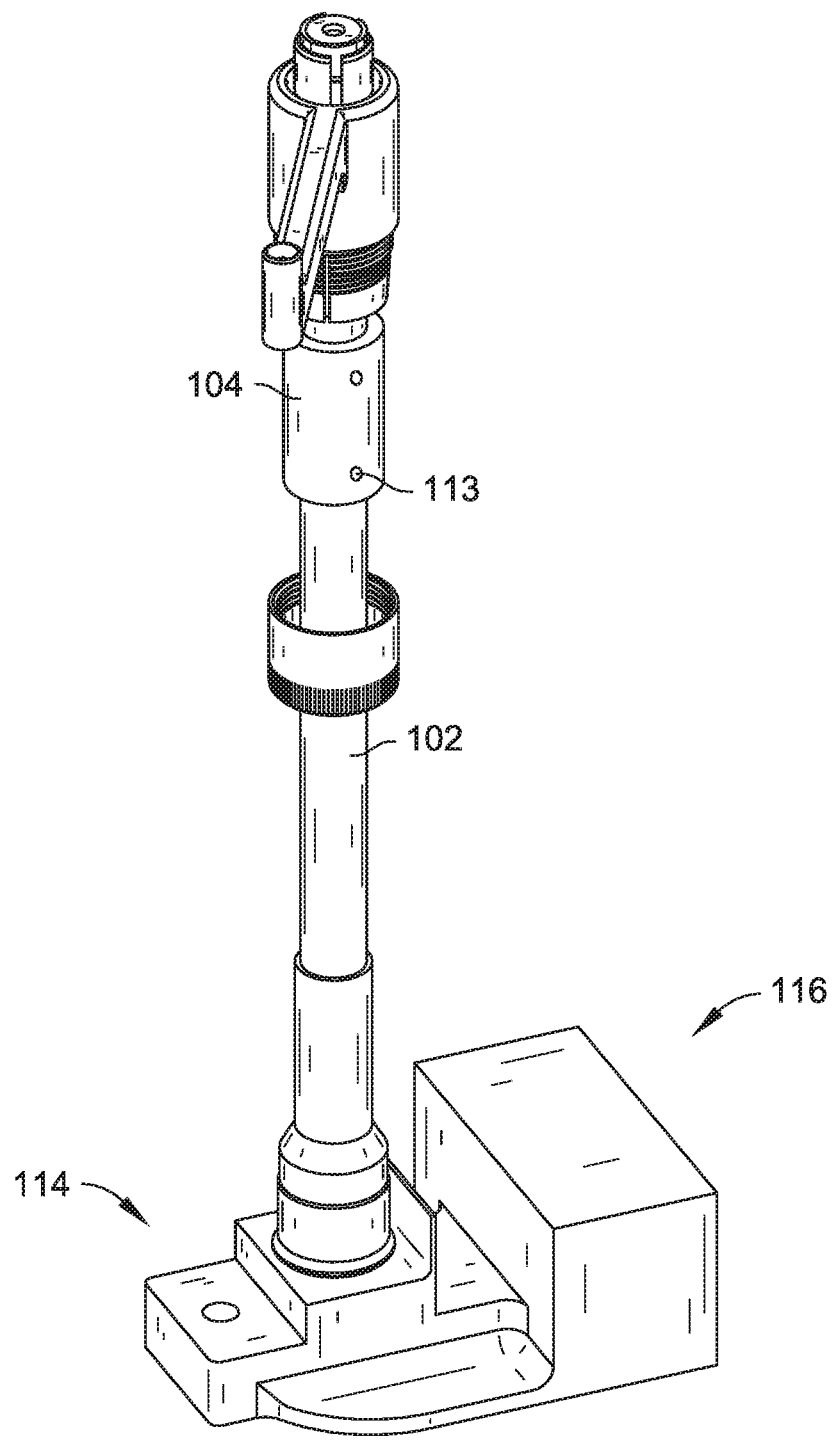
FIG. 2A is a front, isometric view of a z-axis support with a carriage mounted thereon for carrying an autosampler arm, in accordance with the embodiment shown in FIGS. 1A-1C.
Figure 2B:
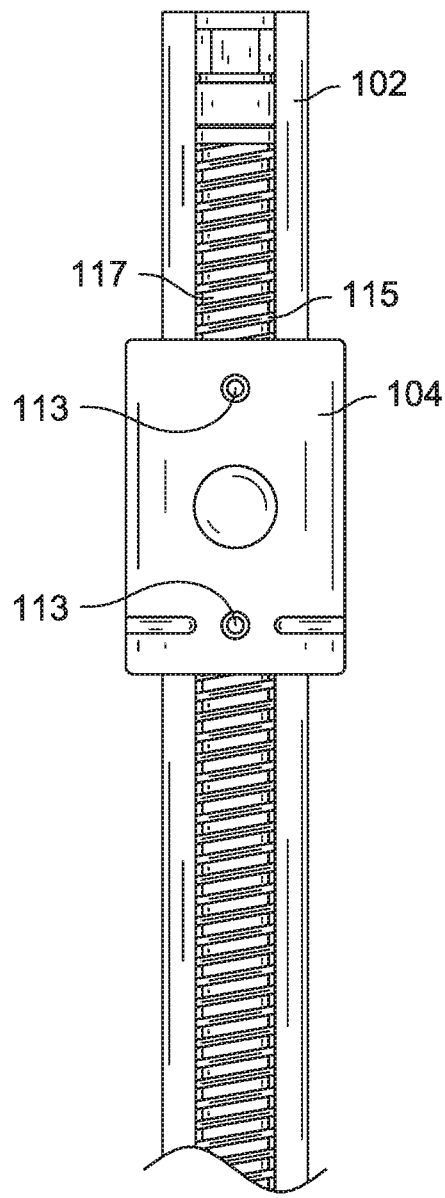
FIG. 2B is a rear, isometric view of a top portion of the z-axis support shown in FIG. 2A, along with the carriage mounted thereon.

As best seen in FIGS. 2A-2B, the carriage 104 can be carried or otherwise mounted on the z-axis mount 102 at a desired vertical position along the z-axis mount 102, for example, being fixed in position via one or more set screws 113. In an embodiment, the one or more set screws 113 can bias against an external surface of the z-axis mount 102 (as shown in FIG. 2A). In another embodiment, the one or more set screws 113 can bias in threading 115 carried a partially exposed internal helical member 117 of the z-axis mount 102 (as shown in FIG. 2B). The autosampler arm 106 can, in turn, be carried on the z-axis mount 102 via the carriage 104, as will be explained in further detail later. The z-axis mount 102 can further have a mount base 114 and a rotational drive unit 116 (e.g., an electric motor and an accompanying rotary drive connection) associated therewith. The mount base 114 can be generally mounted perpendicular (e.g., 85°-95° or 88°-92° or)89.5°-90.5° to a distal end of the z-axis mount 102 and thus configured to maintain the z-axis mount 102 in an upright position during operation of the autosampler system 100. The rotational drive unit 116 may also be carried by the mount base 114 and can be operatively linked with the z-axis mount 102 (specific drive connection not shown) in a manner to facilitate the selectable rotation of the z-axis mount 102 and, by extension, the autosampler arm 106.

Figure 3A:
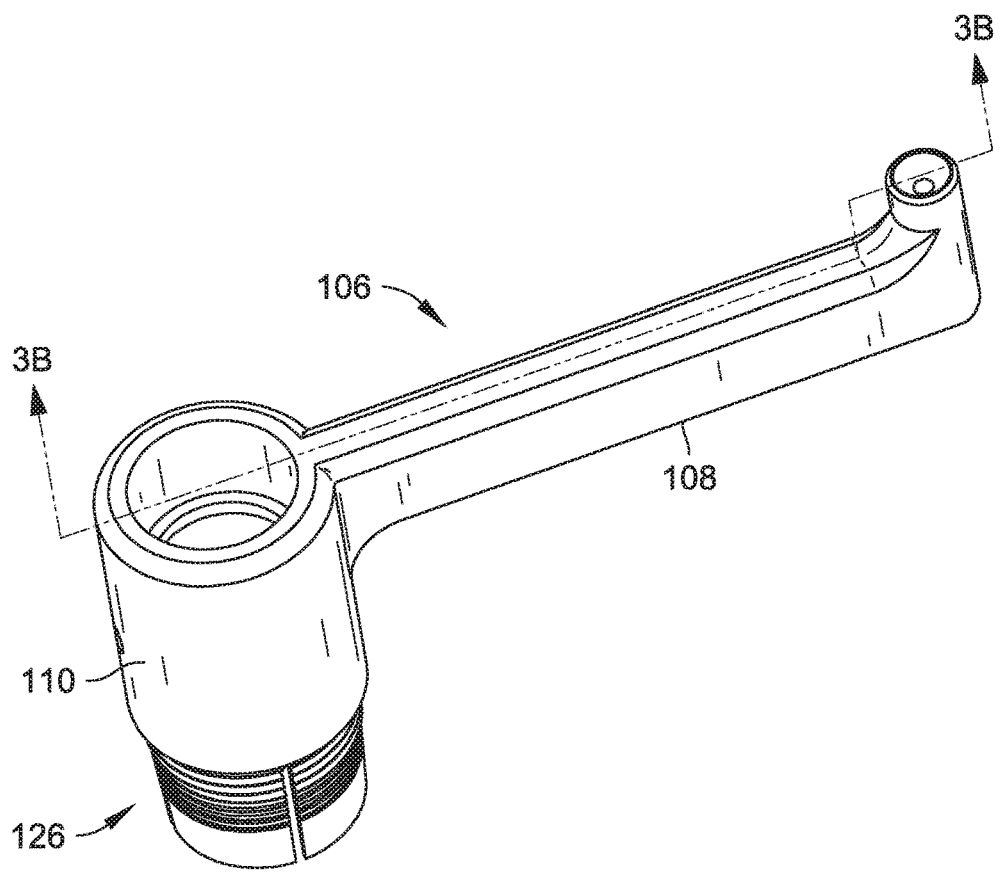
FIG. 3A is a side, isometric view of an autosampler arm, in accordance with the embodiment shown in FIGS. 1A-1C.
Figure 3B:
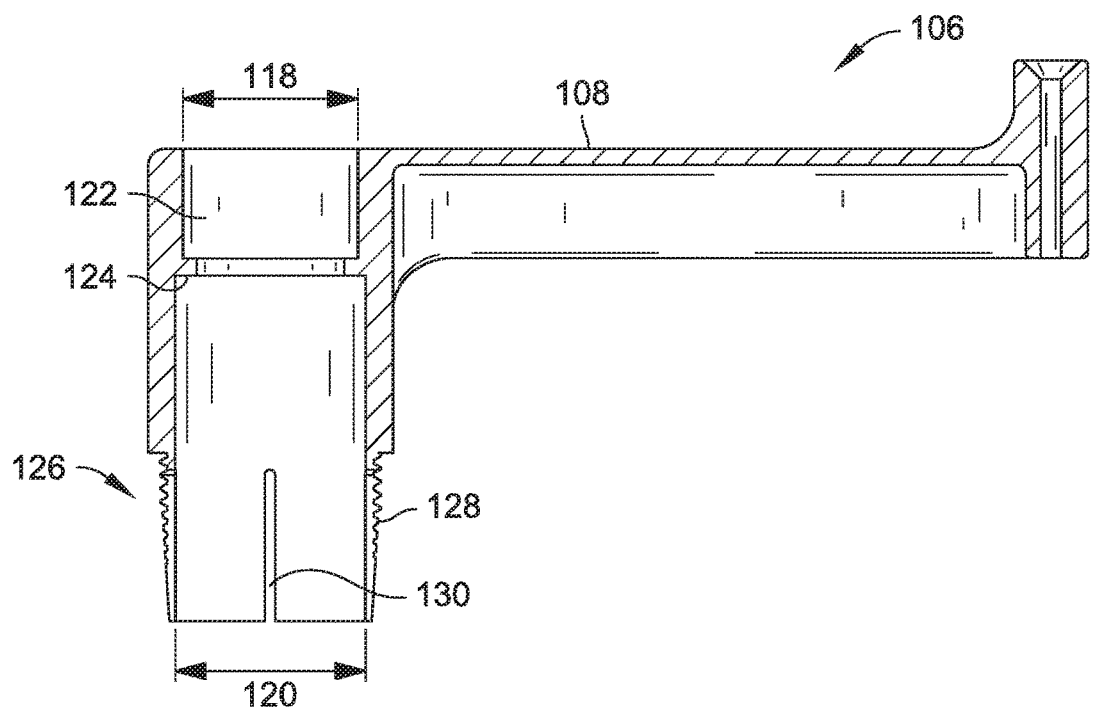
FIG. 3B is a cross-sectional view, taken along section line 3B-3B, of the autosampler arm shown in FIG. 3A.

Referring to FIGS. 3A and 3B, along with FIGS. 1A-1C, the autosampler arm mount 110 can define an arm mount outer diameter 118, an arm mount inner diameter 120, an arm mount aperture 122 (e.g., a through hole), an arm mount inner ledge 124, and an arm mount compressible attachment section 126. The arm mount aperture 122 can be configured to receive the z-axis mount 102 and the carriage 104 therethrough. The arm mount inner ledge 124 can have a narrower through cross-section than the remainder of the arm mount aperture 122, allowing the z-axis mount 102 to extend therethrough but otherwise providing a location for the autosampler arm mount 110 to rest upon and be supported by the carriage 104. The arm extension 108 of the autosampler arm 106 can be carried on (e.g., attached to or co-formed/made integral with) the arm mount outer diameter 118 of the autosampler arm mount 110. A distal end of the arm extension 108 can be configured to hold or otherwise support a sample probe (not shown), via which samples can be drawn and/or delivered.

The arm mount compressible attachment section 126 can be located at a bottom portion of the autosampler arm mount 110. The arm mount compressible attachment section 126 can include attachment section threading 128 and at least one attachment section compression slot 130. The one or more attachment section compression slots 130 are configured to allow the diameter of the arm mount compressible attachment section 126 to be reduced/compressed (e.g., by up to the total of the widths associated with the one or more attachment section compression slots 130) upon engagement of the mount securing portion 112.

Further, the arm mount compressible attachment section 126 may increase in outer diameter, as seen in FIG. 3B, proceeding from a distal bottom edge upward (e.g., toward a midsection of the autosampler arm mount 110) (e.g., increase in diameter of ⅛ in or 1/16 in over the length of the attachment section threading 128) to facilitate compression thereof when engaged by the mount securing portion 112. That is, the arm mount compressible attachment section 126 may be frustoconical in shape, narrowing toward its distal, bottom edge. The reduction of the arm mount inner diameter 120 of the arm mount compressible attachment section 126 of the autosampler arm mount 110, upon engagement of the mount securing portion 112, can result in a compressive or interference fit between the arm mount compressible attachment section 126 and the adjacent/proximate portion of the z-axis mount 102 and/or the carriage 104. Additionally, from a longitudinal perspective, the engagement of the mount securing portion 112 can also help draw the arm mount inner ledge 124 down into a closer (e.g., tighter) engagement with the top of the carriage 104, also increasing the stability of the mounting of the autosampler arm mount 110 to the z-axis mount 102 and/or the carriage 104.

Figure 4A:
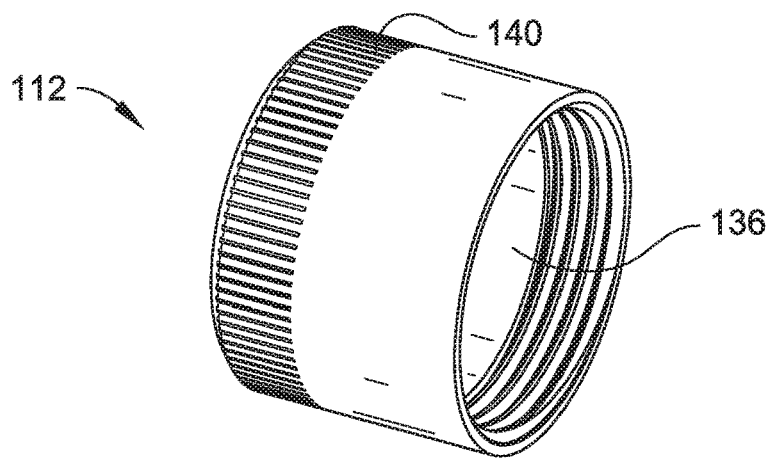
FIG. 4A is a top, isometric view of a mount securing portion, illustrated in the form of a compression nut, in accordance with the embodiment shown in FIGS. 1A-1C.
Figure 4B:
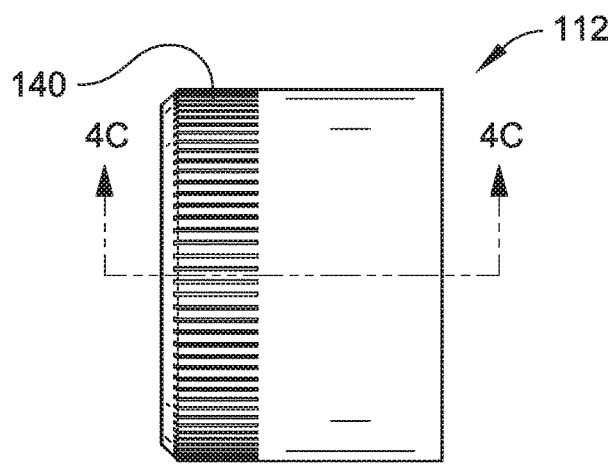
FIG. 4B is a side view of the mount securing portion shown in FIG. 4A.
Figure 4C:
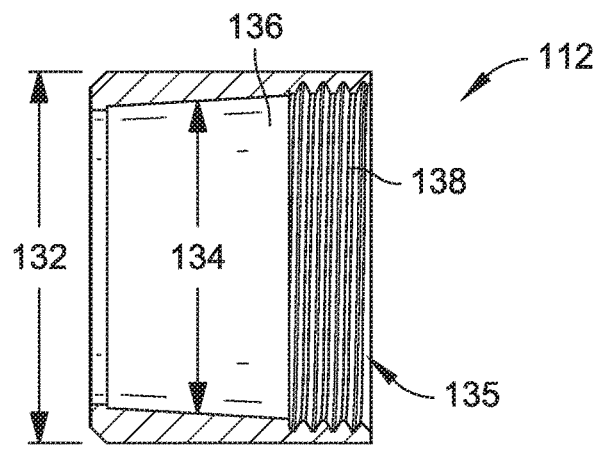
FIG. 4C is a cross-sectional view of the mount securing portion shown in FIG. 4B, taken along the line 4C-4C.

As best seen in FIGS. 4A-4C, the mount securing portion 112 may be in the form of a compression nut. The mount securing portion 112 may define a securing portion outer diameter 132, a securing portion inner diameter 134, a securing portion aperture 136 (e.g., a nut through-hole), securing portion inner threading 138, and a grip portion 140 (e.g., a knurled surface portion; or a portion otherwise provided with ridges and/or grooves). The securing portion inner diameter 134 can be widest at a first aperture opening 135 of the securing portion aperture 136 and then steadily decrease within the interior of the mount securing portion 112 (e.g., sloping inwardly progressing away from the first aperture opening 135). The progressively decreasing inner diameter 134 can promote the compression of the corresponding arm mount compressible attachment section 126 as the mount securing portion 112 is threaded or otherwise screwed onto the attachment section threading 128. As seen from FIG. 4C, in some embodiments, the region of the securing portion aperture 136 closest to the opening thereof can be provided with the securing portion inner threading 138, with the number of threads associated therewith being sufficient to maintain a desired threaded connection with the attachment section threading 128 of the arm mount compressible attachment section 126, when the mount securing portion 112 is, for example, fully engaged.

FIGS. 1A-1C illustrate various states of assembly of the autosampler system 100, according to an example embodiment of the present disclosure. In FIG. 1C, the autosampler arm mount 110 of the autosampler arm 106 and the mount securing portion 112 are co-located about the z-axis mount 102 but are unassembled relative to one another, with the widest portion of the securing portion aperture 112 facing the autosampler arm mount 110. Also, in FIG. 1C, the autosampler mount 110 is positioned to ride internally on the carriage 104, with the carriage 104 mounted on the z-axis mount 102 (FIGS. 2A & 2B). FIG. 1B shows the mount securing portion 112 partially screwed into place on the arm mount compressible attachment section 126 and thus beginning to collapse the arm mount compressible attachment section 126 toward the carriage 104 and/or the z-mount axis 102. Finally, FIG. 1A shows the mount securing portion 112 fully screwed into place onto the autosampler mount 110 of the autosampler arm 106. Disassembly of such parts, of course, can be achieved in the reverse order of that just described with respect to FIGS. 1A-1C.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An autosampler system, comprising:
    a z-axis mount;
    a carriage axially positioned on the z-axis mount;
    an autosampler arm defining an arm extension and an autosampler arm mount, the autosampler arm mount defining an arm mount aperture, an arm mount inner ledge, and an arm mount compressible section, the arm mount aperture configured to receive the z-axis mount and the carriage therethrough, the arm mount inner ledge extending from an interior of the arm mount aperture, the arm mount inner ledge configured to receive the z-axis mount therethrough and to be supported on the carriage, the arm mount compressible section defining a set of compressible section threading and at least one compressible section slot; and
    a compression nut affixed to the arm mount compressible section via the set of compressible section threading.

2. The autosampler system as recited in claim 1, wherein the carriage includes at least one set screw for fixing the position of the carriage relative to the z-axis mount.

3. The autosampler system as recited in claim 1, wherein the z-axis mount has a mount base associated therewith, the mount base generally perpendicularly connected to an end of the z-axis mount.

4. The autosampler system as recited in claim 3, further comprising a rotational drive unit carried by the mount base, the rotational drive unit operatively linked with the z-axis mount to facilitate selectable rotation of the z-axis mount.

5. The autosampler system as recited in claim 1, wherein the arm extension is carried on the autosampler arm mount, the arm extension configured to support a sample probe.

6. The autosampler system as recited in claim 1, wherein the compression nut is configured to reduce the diameter of the arm mount compressible section by up to an amount made available from the at least one compressible section slot.

7. The autosampler system as recited in claim 6, wherein the compression nut is configured to draw the arm mount inner ledge into contact with the carriage, upon tightening of the compression nut on the arm mount compressible section.

8. The autosampler system as recited in claim 1, wherein the compression nut defines a nut outer diameter and a nut inner diameter, the nut inner diameter defining a nut inner threading, the nut inner threading configured to engage the compressible section threading.

9. The autosampler system as recited in claim 8, wherein the nut inner diameter progressively decreases to promote the compression of the arm mount compressible section as the compression nut is threaded onto the arm mount compressible section.

10. The autosampler system as recited in claim 9, wherein the arm mount compressible section is frustoconical in shape, narrowing toward a distal, bottom edge thereof.

11. The autosampler system as recited in claim 1, wherein the arm mount compressible section has an interference fit with at least one of the z-axis mount or the carriage, upon engagement of the compression nut with the arm mount compressible section.

12. An autosampler arm assembly configured to be carried on a z-axis mount, the z-axis mount having a carriage axially positioned thereon, comprising:
    an autosampler arm defining an arm extension and an autosampler arm mount, the autosampler arm mount defining an arm mount aperture, an arm mount inner ledge, and an arm mount compressible section, the arm mount aperture configured to receive the z-axis mount and the carriage therethrough, the arm mount inner ledge extending from an interior of the arm mount aperture, the arm mount inner ledge configured to receive the z-axis mount therethrough and to be supported on the carriage, the arm mount compressible section defining a compressible section threading therein and at least one compressible section slot therethrough; and
    a mount securing portion defining a securing portion inner diameter, the securing portion inner diameter including a securing portion inner threading, the mount securing portion affixed to the arm mount compressible section via engagement of the compressible section threading with the securing portion inner threading.

13. The autosampler system as recited in claim 12, wherein the arm extension is carried on the autosampler arm mount, the arm extension configured to support a sample probe.

14. The autosampler arm assembly as recited in claim 12, wherein the mount securing portion is configured to reduce the diameter of the arm mount compressible section by up to an amount made available from the at least one compressible section slot.

15. The autosampler arm assembly as recited in claim 14, wherein the mount securing portion is configured to draw the arm mount inner ledge into contact with the carriage, upon tightening of the mount securing portion on the arm mount compressible section.

16. The autosampler arm assembly as recited in claim 12, wherein the mount securing portion defines a securing portion outer diameter and a grip portion associated with the securing portion outer diameter.

17. The autosampler arm assembly as recited in claim 12, wherein the securing portion inner diameter progressively decreases to promote the compression of the arm mount compressible section as the mount securing portion is threaded onto the arm mount compressible section.

18. The autosampler arm assembly as recited in claim 12, wherein the arm mount compressible section is frustoconical in shape, narrowing toward a distal, bottom edge thereof.

19. The autosampler arm assembly as recited in claim 12, wherein the arm mount compressible section is configured to form an interference fit with at least one of the z-axis mount or the carriage, upon engagement of the mount securing portion with the arm mount compressible section.

20. The autosampler arm assembly as recited in claim 12, wherein mount securing portion is a compression nut.

* * * * *